(12) United States Patent
Vair et al.

(10) Patent No.: US 7,912,713 B2
(45) Date of Patent: Mar. 22, 2011

(54) AUTOMATIC SPEECH RECOGNITION SYSTEM AND METHOD USING WEIGHTED CONFIDENCE MEASURE

(75) Inventors: Claudio Vair, Turin (IT); Daniele Colibro, Turin (IT)

(73) Assignee: Loquendo S.p.A., Turin (IT)

( * ) Notice: Subject to any disclaimer, the term of this patent is extended or adjusted under 35 U.S.C. 154(b) by 936 days.

(21) Appl. No.: 11/794,356

(22) PCT Filed: Dec. 28, 2004

(86) PCT No.: PCT/EP2004/053718
§ 371 (c)(1),
(2), (4) Date: Jun. 28, 2007

(87) PCT Pub. No.: WO2006/069600
PCT Pub. Date: Jul. 6, 2006

(65) Prior Publication Data
US 2008/0114595 A1 May 15, 2008

(51) Int. Cl.
*G10L 15/14* (2006.01)
(52) U.S. Cl. ..................................................... 704/236
(58) Field of Classification Search .................. 704/236
See application file for complete search history.

(56) References Cited

U.S. PATENT DOCUMENTS

| | | | |
|---|---|---|---|
| 5,710,866 | A | 1/1998 | Alleva et al. |
| 6,421,640 | B1 | 7/2002 | Dolfing et al. |
| 6,539,353 | B1 | 3/2003 | Jiang et al. |

FOREIGN PATENT DOCUMENTS

WO WO-03/073416 A1 9/2003

OTHER PUBLICATIONS

Huang, X., Acero A., and Hon, H.W., "Mel-Frequency Cepstrum, Speech Signal Representations", Spoken Language Processing: A Guide to Theory, Algorithm, and System Development, pp. 316-318, (2001).
Huang, X., Acero A., and Hon, H.W., "Hidden Markov Models", Spoken Language Processing: A Guide to Theory, Algorithm, and System Development, Prentice Hall, Chapter 8, pp. 377-413, (2001).

(Continued)

*Primary Examiner* — Susan McFadden
(74) *Attorney, Agent, or Firm* — Finnegan, Henderson, Farabow, Garrett & Dunner, L.L.P.

(57) ABSTRACT

An automatic speech recognition method for identifying words from an input speech signal includes providing at least one hypothesis recognition based on the input speech signal, the hypothesis recognition being an individual hypothesis word or a sequence of individual hypothesis words, and computing a confidence measure for the hypothesis recognition, based on the input speech signal, wherein computing a confidence measure includes computing differential contributions to the confidence measure, each as a difference between a constrained acoustic score and an unconstrained acoustic score, weighting each differential contribution by applying thereto a cumulative distribution function of the differential contribution, so as to make the distributions of the confidence measures homogeneous in terms of rejection capability, as the language, vocabulary and grammar vary, and computing the confidence measure by averaging the weighted differential contributions.

17 Claims, 2 Drawing Sheets

OTHER PUBLICATIONS

L. Fissore, F. Ravera, P. Laface, "Acoustic-Phonetic Modelling for Flexible Vocabulary Speech Recognition", Proc. of Eurospeech, '95, $4^{th}$ European Conference on Speech Communication and Technology, Madrid, Spain, pp. 799-802, (1995).

Rivilin, Z. et al., "A Phone-Dependent Confidence Measure for Utterance Rejection", Proc. of the IEEE International Conference on Acoustics, Speech, and Signal Processing, Atlanta, GA, pp. 515-517, (1996).

Bernardis, G. et al., "Improving Posterior Based Confidence Measures in Hybrid HMM/ANN Speech Recognition Systems", Proceedings of the International Conference on Spoken Language Processing, pp. 775-778, Sydney, Australia, (1998).

Gillick, M. et al., "A Probabilistic Approach to Confidence Estimation and Evaluation", Proc. of the IEEE International Conference on Acoustics, Speech and Signal Processing, Munich, Germany, pp. 879-882, (1997).

Weintraub, M. et al., "Neural Network Based Measures of Confidence for Word Recognition", Proc. of the IEEE International Conference on Acoustics, Speech, and Signal Processing, Munich, Germany, pp. 887-890, (1997).

Andorno, M. et al., "Experiments on Confidence Scoring for Word and Sentence Verification", Proc. of the International Conference on Spoken Language Processing, pp. 1377-1380, Denver, CO, (2002).

AUTOMATIC SPEECH RECOGNITION SYSTEM AND METHOD USING WEIGHTED CONFIDENCE MEASURE

CROSS REFERENCE TO RELATED APPLICATION

This application is a national phase application based on PCT/EP2004/053718, filed Dec. 28, 2004.

TECHNICAL FIELD OF THE INVENTION

The present invention relates in general to automatic speech recognition, and in particular to confidence measure in automatic speech recognition.

BACKGROUND ART

As is known, automatic speech recognition systems (ASRs) are designed to convert a digital representation of a voice signal, which conveys the speech, into a textual sequence of words, which hypothesizes the lexical content of the voice signal itself. The automatic recognition process uses stochastic acoustic models, hence, the result produced, in terms of sequence of recognized words, may be affected by an other than zero residual error rate. Furthermore, the domain of the formulations recognized by an automatic speech recognition system is in any case linked to a limited vocabulary, formalized by means of a statistical language model or context-free grammars, which can be reduced to finite-state automata (this is the case, for example, of a grammar that describes the way to pronounce a date or a time). The pronunciation of words outside the vocabulary or of formulations that are not envisaged consequently generates recognition errors. It is therefore to be hoped that an automatic speech recognition system will have available a measure of the reliability of the recognized words.

For the above purpose, automatic speech recognition systems provide what in the literature is known as confidence measure, which is a reliability indicator comprised between 0 and 1, and which can be applied to the individual recognized words and/or to their sequence. In the event of recognition error, the confidence measure should assume low values, and in any case ones lower than those that are assumed in the absence of errors. A threshold on the confidence values measured can be fixed so as to prevent proposal of results that are not so reliable.

The most advanced automatic speech recognition systems enable recognition within flexible vocabularies, which are defined by the user and described by means of appropriate formalisms. To achieve this result, the voice models used for recognition are made up of elementary acoustic-phonetic units (APUs) or sub-words, the sequential composition of which enables representation of any word of a given language. The mathematical tools used for describing the temporal evolution of the voice are the so-called hidden Markov models (HMMs), and each elementary acoustic-phonetic unit is represented by a hidden Markov model, which is formed by states that describe the temporal evolution thereof. The words to be recognized, which are described as sequences of elementary acoustic-phonetic units, are obtained by concatenating individual constituent hidden Markov models.

In addition to describing the temporal evolution of the voice, hidden Markov models enable generation of the likelihoods of emission, also known as output likelihoods, of the acoustic states that form them, given the observation vectors that convey the information of the voice signal. The sequence of the probabilities, together with their temporal evolution, enables the recognition result to be obtained.

The likelihood of emission of the acoustic states of the hidden Markov models can be obtained using a characterizing statistical model, in which the distributions of the observation vectors, which summarize the information content of the voice signal at discrete time quanta, hereinafter referred to as frames, are, for example, represented by mixtures of multivariate Gaussian distributions. By means of training algorithms, which are known in the literature as Segmental K-Means and Forward Backward, it is possible to estimate mean value and variance of the Gaussian distributions of the mixtures, starting from pre-recorded and annotated voice databases. For a more detailed description of hidden Markov model theory, algorithms and implementation, reference may be made to Huang X., Acero A., and Hon H. W., *Spoken Language Processing: A Guide to Theory, Algorithm, and System Development*, Prentice Hall, Chapter 8, pages 377-413, 2001.

Another method for obtaining the likelihood of emission of hidden Markov models is to use discriminative models, which tend to highlight the peculiarities of the individual models as compared to others. A technique that is known in the literature and is widely used is that of artificial neural networks (ANNs), which represent nonlinear systems capable of producing, following upon training, the likelihoods of emission of the acoustic states, given the acoustic observation vector. Recognition systems of this type are generally referred to as Hybrid HMM-NNs.

The detail of the elementary acoustic-phonetic units used as components for composition of the word models may depend upon the type of modelling of the likelihoods of emission of Markov states. In general, when recourse is had to characterizing models (mixtures of multivariate Gaussian distributions), contextual elementary acoustic-phonetic units are adopted. An exemplifying case is that of triphones, which represent the basic phonemes of a given language that are specialized within the words in their left-hand and right-hand contexts (adjacent phonemes). In the case of elementary acoustic-phonetic units trained using discriminative training (for example, with the ANN technique), the need for contextualization may be less marked; in this case, use may be made of context-independent phonemes or of composition of stationary units (i.e., the stationary part of the context-independent phonemes) and transition units (i.e., transition biphones between phonemes), as described in L. Fissore, F. Ravera, P. Laface, *Acoustic-Phonetic Modelling for Flexible Vocabulary Speech Recognition*, Proc. of EUROSPEECH, pp. I 799-802, Madrid, Spain, 1995.

A method that is widely employed in the prior art to compute the confidence consists in the use of the so-called a posteriori likelihoods, which are quantities derived from the emission likelihoods of the hidden Markov models. The logarithm of the a posteriori likelihoods, calculated for each frame, can be averaged by weighting all the frames equally or else weighting all the phonemes equally, as described in Rivlin, Z. et al., *A Phone-Dependent Confidence Measure for Utterance Rejection*, Proc. of the IEEE International Conference on Acoustics, Speech and Signal Processing, Atlanta, Ga., pp. 515-517 (May 1996). Similar criteria can be used also in Hybrid HMM-NN systems, which are able to produce directly the a posteriori likelihoods of the states/phonemes. In Bernardis G. et al., *Improving Posterior Based Confidence Measures in Hybrid HMM/ANN Speech Recognition System*, Proceedings of the International Conference on Spoken Language Processing, pp. 775-778, Sydney, Australia (December 1998), a comparison is provided of different ways of averaging a posteriori likelihoods to obtain confidence measures on a phoneme basis or on a word basis.

Another widely used technique envisages normalizing the a posteriori likelihoods, or directly the emission likelihoods, that concur in the confidence computation by means of a factor that does not take into account the lexical and grammatical recognition constraints. The comparison of the two quantities, i.e., the result obtained applying the constraints and the result obtained relaxing the constraints, provides information useful for determining the confidence. In fact, if the two quantities have comparable values, it means that the introduction of the recognition constraints has not produced any particular distortion with respect to what would have happened without recognition constraints. The recognition result may therefore be considered reliable, and its confidence should have high values, close to its upper limit. When, instead, the constrained result is considerably worse than the unconstrained result, it may be inferred that the recognition is not reliable in so far as the automatic speech recognition system would have produced a result different from the one obtained as a consequence of the application of the constraints. In this case, the confidence measure ought to produce low values, close to its lower limit.

Various embodiments of this technique have been proposed in the literature. In Gillick M. et al., *A Probabilistic Approach to Confidence Estimation and Evaluation*, Proc. of the IEEE International Conference on Acoustics, Speech and Signal Processing, Munich, Germany, pp. 879-882 (May 1997), the difference between quantities known as acoustic score and best score is adopted, where the two terms are obtained respectively by averaging the acoustic score (with constraints) and the best score (without constraints), produced for each frame by the acoustic hidden Markov models on the time interval corresponding to the words. Likewise, in U.S. Pat. No. 5,710,866 to Alleva et al., the confidence is computed as the difference between a constrained acoustic score and an unconstrained acoustic score, and this difference is calculated for each frame so as to be usable for adjusting the constrained acoustic score employed during recognition. Weintraub, M. et al., *Neural Network Based Measures of confidence for Word Recognition*, Proc. of the IEEE International Conference on Acoustics, Speech and Signal Processing, Munich, Germany, pp. 887-890 (May 1997), proposes a family of confidence measures based upon acoustic features that differ for the type of models used as normalization factor and for the level at which the logarithms of the likelihoods of the hidden Markov models for the various frames are combined (word level, phone level, phone-state level). The models used as normalization may be context-independent phonemes or Gaussian-mixture models (GMMs) and enable the result to be obtained in the case of absence of recognition constraints.

A further formulation, which refers to a hybrid HMM-NN system, is proposed in Andorno M. et al., *Experiments in Confidence Scoring for Word and Sentence Verification*, Proc. of the International Conference on Spoken Language Processing, pp. 1377-1380, Denver, Colo. (September 2002). In this case, the confidence is obtained as a ratio between the unconstrained acoustic score and the constrained acoustic score. The numerator is calculated as the average, on the number of frames of the word, of the logarithms of the best a posteriori likelihood between all the states of the acoustic models, whereas the denominator is represented by the average of the a posteriori likelihoods over the sequence of states that is produced by the so-called Viterbi alignment. For a more detailed description of the Viterbi alignment, reference may be made to the above-referenced *Spoken Language Processing: A Guide to Theory, Algorithm, and System Development*, chapter 8.

Likewise known in the prior-art are techniques for improving the confidence measure. In U.S. Pat. No. 6,421,640, for example, the confidence is adapted via an offset specific for the user or the phrase pronounced, prior to being compared with the threshold for deciding whether to propose the recognition result to the user.

In U.S. Pat. No. 6,539,353 the improvement in the quality of the confidence measure is obtained by applying a specific weighting to sub-word confidence measures, which are then combined to obtain the word confidence measure.

The variety of elementary acoustic-phonetic units, also within the same automatic speech recognition system, causes a lack of homogeneity in the emission likelihoods (a posteriori likelihoods), which are affected by the detail of the elementary acoustic-phonetic units, by their occurrence in the words of a given language, by the characteristics of the sounds that they represent, by the amount of training material available for their estimation, and so forth. Since the confidence measures known in the literature are derived from the emission likelihoods, variability of the latter produces instability and lack of homogeneity in the confidence itself.

OBJECT AND SUMMARY OF THE INVENTION

The object of the present invention is therefore to make the confidence measure homogeneous in terms of rejection capability and independent of the contents of the grammars and recognition vocabularies, of the language of the acoustic models and, in general, of the recognition constraints.

This object of the present invention is achieved by an automatic speech recognition method for identifying words from an input speech signal, including:
  providing at least one hypothesis recognition based on said input speech signal, said hypothesis recognition being an individual hypothesis word or a sequence of individual hypothesis words; and
  computing a confidence measure ($C_{DC}$) for said hypothesis recognition, based on said input speech signal;
  wherein computing a confidence measure ($C_{DC}$) includes:
    computing differential contributions ($C_{i,t}$) to said confidence measure ($C_{DC}$), each as a difference between a constrained acoustic score ($SCV_{i,t}$) and an unconstrained acoustic score ($SCL_t$); and
    computing said confidence measure ($C_{DC}$) based on said differential contributions ($C_{i,t}$);
  characterized in that computing said confidence measure ($C_{DC}$) based on said differential contributions ($C_{i,t}$) includes:
    weighting each differential contribution ($C_{i,t}$) with a cumulative distribution function ($F_{\xi_i}$) of the differential contribution ($C_{i,t}$).
  In preferred embodiments, said cumulative distribution functions of the differential contributions ($C_{i,t}$) may be such that distributions of the confidence measures ($C_{DC}$) are homogeneous in terms of rejection capability, as at least one of language, vocabulary and grammar varies; and each differential contribution ($C_{i,t}$) may be computed according to the following equation:

$$C_{i,t} = F_{\xi_i}(SCV_{i,t} - SCL_t)$$

wherein $C_{i,t}$ is said differential contribution, $F_{\xi_i}$ is said cumulative distribution function, $SCV_{i,t}$ is said constrained acoustic score for acoustic state i of a hidden Markov model which models a given acoustic-phonetic unit, which, in turn, models a corresponding speech phenomena, at input speech frame t, and $SCL_t$ is said unconstrained acoustic score at input speech frame t.

The constrained acoustic score ($SCV_{i,t}$) may be computed according to the following equation:

$$SCV_{i,t} = \log P(S_i | o_t)$$

wherein $P(S_i * o_t)$ is a likelihood of emission of acoustic states $S_i$, given an observation vector $o_t$ extracted from the input speech signal at input speech frame t, wherein said unconstrained acoustic score ($SCL_t$) may be computed according to the following equation:

$$SCL_t = \log\left[\max_{1 \leq j \leq N_s} P(S_j | o_t)\right]$$

wherein $N_s$ is the total number of states of the hidden Markov models, and wherein each differential contribution ($C_{i,t}$) may be computed according to the following equation:

$$C_{i,t} = F_{\xi_i}\left\{\log \frac{P(S_i | o_t)}{\max_{1 \leq j \leq N_s} P(S_j | o_t)}\right\}.$$

In other preferred embodiments of the automatic speech recognition method, said confidence measure ($C_{DC}$) may be computed as a temporal average of said weighted differential contributions ($C_{i,t}$) over the sequence of recognized acoustic states ($S_i^*$) of elementary acoustic-phonetic units forming said recognition, wherein said confidence measure ($C_{DC}$) may be computed according to the following equation:

$$C_{DC} = \frac{1}{T}\sum_{t=1}^{T} F_{\xi_i*}\left\{\log \frac{P(S_{i*} | o_t)}{\max_{1 \leq j \leq N_s} P(S_j | o_t)}\right\}$$

where T is the number of frames of the input speech signal;

said emission likelihood may be an a posteriori likelihood computed from a likelihood based on a hidden Markov model;

said emission likelihood may be an a posteriori likelihood computed by an artificial neural network of a hybrid hidden Markov model-neural network system; and said emission likelihood may be computed by a hybrid hidden Markov model-neural network system according to the following equation:

$$P(S_i | o_t) = \frac{e^{n_i(o_t)}}{\sum_{j=1}^{N} e^{n_j(o_t)}}$$

wherein $n_i(o_t)$ is the output of said neural network and is indicative of the activity of the acoustic state $S_i$, given the observation vector $o_t$, wherein said differential contribution ($C_{i,t}$) may be computed as follows:

$$C_{i,t} = F_{\xi_i}\left\{\log \frac{e^{n_j(o_t)}}{e^{\max_j n_j(o_t)}}\right\} = F_{\xi_i}\left[n_i(o_t) - \max_j n_j(o_t)\right], \text{ and}$$

wherein said confidence measure ($C_{DC}$) may be computed as follows:

$$C_{DC} = \frac{1}{T}\sum_{t=1}^{T} F_{\xi_i*}\left[n_{i*}(o_t) - \max_{j \in stat} n_j(o_t)\right]$$

where T is the number of frames of the input speech signal.

In other embodiments of the present invention, each cumulative distribution function ($F_{\xi_i}$) may be based on a probability density function with one of a Gaussian shape, a binomial shape, a Poisson shape, and a Gamma shape; and each cumulative distribution function ($F_{\xi_i}$) may be trained from training speech data using fitting methods.

The object of the present invention is also achieved by an automatic speech recognition system for identifying words from an input speech signal, including:

a search engine (6) configured to provide at least one hypothesis recognition based on said input speech signal, said hypothesis recognition being an individual hypothesis word or a sequence of individual hypothesis words; and a confidence measure module (8) configured to compute a confidence measure ($C_{DC}$) for said hypothesis recognition, based on said input speech signal;

characterized in that said confidence measure module (8) is configured to compute said confidence measure ($C_{DC}$) as set forth in the method described above.

It is also an object of the present invention to provide a computer program product comprising a computer program code able, when loaded in a processing system, to implement the method described above.

The present invention achieves the aforementioned object by making use of a confidence measure based upon differential contributions computed for each frame of the analysis window as a difference between the unconstrained acoustic score and the constrained acoustic score, and averaged over the entire recognition interval. This makes it possible to act on the individual differential contribution of the summation, by applying thereto a respective normalization function, which makes the behaviour of the various elementary acoustic-phonetic units homogeneous in terms of rejection capability, as language, vocabulary and grammar vary. The proposed solution enables the distributions of the confidence measures to be made invariant with respect to language, vocabulary and grammar, and homogeneous between recognition objects and different languages. This facilitates to a great extent development of applications in the initial stages of their development, since they do not require any specific calibration for each individual recognition session.

The normalization function applied to the individual differential terms is constituted by a family of cumulative distributions, one for each differential contribution to the confidence measure. Each function can be estimated in a simple way based upon a set of training data and is specific for each state of the elementary acoustic-phonetic unit. Hence, the proposed solution does not require heuristic considerations or a priori assumptions and makes it possible to obtain all the quantities necessary for deriving the differential confidence measure directly from the training data.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein and defined in the attached claims.

Figure 1:
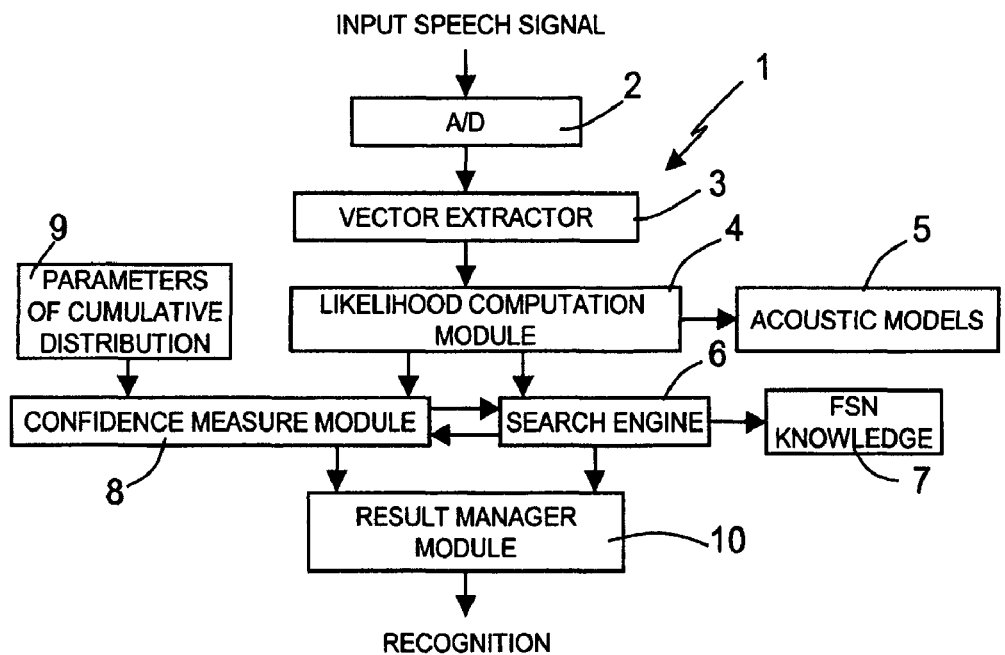
FIG. 1 shows a block diagram of an automatic speech recognition system according to the present invention.

FIG. 1 shows a block diagram of an automatic speech recognition system implementing the differential confidence measure according to the invention.

As shown in FIG. 1, the automatic speech recognition system, designed as a whole by 1, includes:

- an analog-to-digital converter 2 receiving an analog speech signal from an input device (not shown), which may, for example, be a microphone of a personal computer connected to an sound card or a handset of a telephone, connected to either fixed or mobile network, and providing a digitized speech signal formed by a sequence of digital samples;
- a vector extractor 3 receiving the digitized speech signal from the digital-to-analog converter 2, and providing, at fixed frames (e.g., 10 ms), an observation vector, which is a compact vector representation of the information content of the speech. Conveniently, the vector extractor 3 computes, for each frame, the so-called Mel-scale Cepstrum coefficients, which are described in the above-referenced *Spoken Language Processing: A Guide to Theory, Algorithm, and System Development*, pages 316-318;
- a likelihood computation module 4 receiving the observation vectors from the vector extractor 3 and acoustic models of elementary acoustic-phonetic units, stored in a storage module 5 (the acoustic models being Markov automata, the emission likelihoods of which may be determined by mixtures of multivariate Gaussian distributions or using the artificial neural network technique, in particular an hybrid HMM-NN system), and providing the likelihoods of emission of the elementary acoustic-phonetic units;
- a search engine 6 receiving the emission likelihoods from the likelihood computation module 4 and knowledge constraints schematized as finite state network (FSN) knowledge, that describes all the admissible recognition paths, and stored in a storage module 7, and providing a sequence of hypothesis words. In particular, the core of the search engine 6 implements a technique widely known in the literature as dynamic programming, an implementation of which is the aforementioned Viterbi alignment, and which performs a dynamic time warping between the observation vectors and the states of the elementary acoustic-phonetic units;
- a confidence measure module 8 receiving the emission likelihoods from the likelihood computation module 4 and parameters of cumulative distributions computed on the basis of training data, as described hereinafter with reference to FIG. 4, stored in a storage module 9, and providing a confidence measure for each hypothesis word; and
- a result manager module 10 receiving the hypothesis words from the search engine 6 and the confidence measures from the confidence measure module 8, and providing a complete recognition result and, optionally, a list of alternative recognitions (N-best recognitions), which are less probable but potentially useful for the application logic.

During the recognition process, the likelihoods of emission of the elementary acoustic-phonetic units are used to determine the most likely sequence of acoustic states. Alongside the emission likelihoods, for each frame t of the recognition window, a differential contribution $C_{i,t}$ to the confidence measure is computed by the confidence measure module 8, as a difference between a constrained acoustic score $SCV_{i,t}$ for the acoustic state i at input speech frame t, and an unconstrained acoustic score $SCL_t$ at the same input speech frame t, and weighted with a cumulative distribution function $F_{\xi_i}$ of the difference itself, computed based on training speech data:

$$C_{i,t} = F_{\xi_i}(SCV_{i,t} - SCL_t) \qquad \text{(Eq. 1);}$$

wherein the constrained acoustic score may be defined as the likelihood that the input speech matches the recognition hypothesis, the unconstrained acoustic score is defined as the likelihood that the input speech matches the recognition hypothesis without FSN constraints, and the cumulative distribution function $F_{\xi_i}(x)$ is the probability that the variable $\xi_i$ is less than or equal to x. The differential contribution $C_{i,t}$ and the cumulative distribution function $F_{\xi_i}(x)$ are related to the acoustic state i, which is an element of an hidden Markov model chain, which in turn is made up of one or more states, depending on the kind of subwords used to model a given acoustic-phonetic unit.

There are several well-known algorithms for computing the constrained and unconstrained acoustic scores, such as the forward-backward algorithm or the Viterbi algorithm, which are discussed in more detail in the above-referenced *Spoken Language Processing: A Guide to Theory, Algorithm, and System Development*, chapter 8.

Every cumulative distribution function is monotone increasing, with the following limits: $F_{\xi_i}(\infty)=1$ and $F_{\xi_i}(0)=0$. Another useful property is that the cumulative distribution function $F_{\xi_i}$ applied to the corresponding random variable $\xi_i$ produces a new random variable $\eta = F_{\xi_i}(x)$ with a uniform distribution between 0 and 1. Since the individual elementary terms $C_{i,t}$, which are instances of the new uniformly distributed random variable $\eta$, are in the range [0,1] and since they are linked to the comparison between the constrained acoustic score $SCV_{i,t}$ and the unconstrained acoustic score $SCL_{i,t}$, they can be considered to all effects the elementary components of the new confidence measure.

Expressing the constrained acoustic score $SCV_{i,t}$ and the unconstrained acoustic score $SCL_{i,t}$ as a function of the logarithmic likelihoods of emission of acoustic states $S_i$, given the observation vector $o_t$ at the frame t:

$$SCV_{i,t} = \log P(S_i \mid o_t) \qquad \text{(Eq. 2)}$$

$$SCL_t = \log \left[ \max_{1 \leq j \leq N_s} P(S_j \mid o_t) \right] \qquad \text{(Eq. 3)}$$

wherein $N_s$ is the total number of states of the hidden Markov models of the recognition system.

The expanded form of the differential contribution to the confidence measure may be computed as follows:

$$C_{i,t} = F_{\xi_i}\left\{\log\frac{P(S_i \mid o_t)}{\max_{1 \le j \le N_s} P(S_j \mid o_t)}\right\} \quad \text{(Eq. 4)}$$

In the following description, the a posteriori likelihoods generated by an artificial neural network of a hybrid HMM-NN system or derived from the likelihoods based on a standard hidden Markov model are assumed as emission likelihoods.

The numerator of Eq. 4 is the likelihood of emission of the state $S_i$ at frame t available for the dynamic programming algorithm. The denominator of Eq. 4 is, instead, the best emission likelihood available, linked to the unconstrained acoustic score. In order to compute the latter, a specific model can be required, such as, for example, a completely connected phoneme network, to be executed in parallel to the main recognition with a Viterbi step without lexical constraints. Another possibility is deriving the best likelihood from a subset of the models used for the main recognition, choosing, for each time frame, the most promising model once the recognition constraints have been relaxed.

Finally, the confidence measure $C_{DC}$, which, in broad outline, may be defined as a measure of how close the constrained acoustic score is to the best possible matching score for the input speech frame, is then computed as a temporal average of the differential contributions defined by Eq. 4, over the sequence of the states, designated by $S_i^*$, that, among all the possible sequences, represents the recognition result:

$$C_{DC} = \frac{1}{T}\sum_{t=1}^{T} F_{\xi_{i^*}}\left\{\log\frac{P(S_{i^*} \mid o_t)}{\max_{1 \le j \le N_s} P(S_j \mid o_t)}\right\} \quad \text{(Eq. 5)}$$

where T is the number of frames of the input speech.

Based on the time window on which the average is computed and the corresponding sequence of acoustic states of the elementary acoustic-phonetic units, the confidence measure assumes importance for individual recognized words, for a sequence thereof or for the entire recognition result.

Since the confidence measure is computed as an average of random variables uniformly distributed between 0 and 1, it also assumes values in the range [0, 1] and is hence adequate for direct use as a confidence measure. It should moreover be noted that, considering $C_{DC}$ as a random variable, the distribution of the new confidence measure is not of a uniform type, but rather of a Gaussian type, with average 0.5 as demonstrated by the central-limit theorem.

Figure 2:
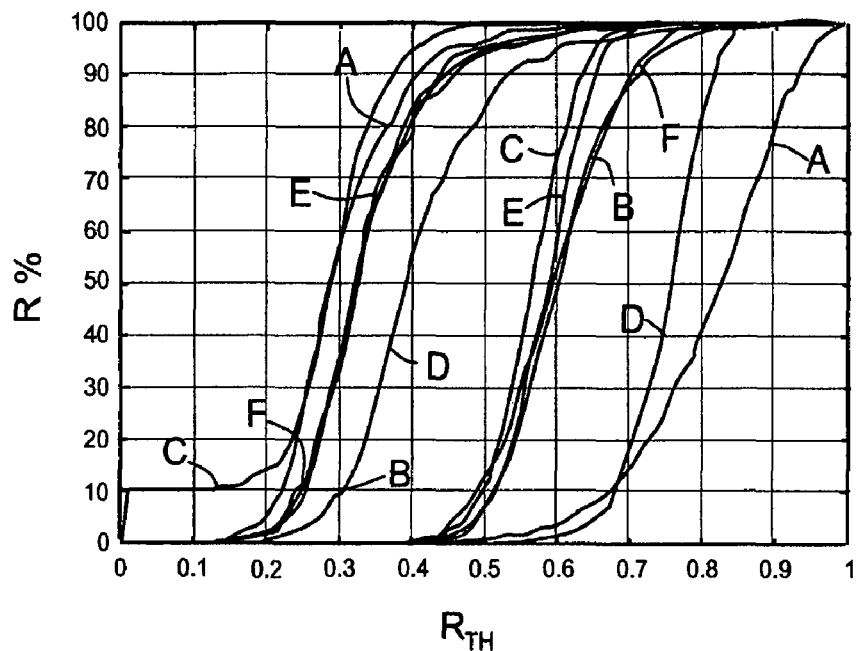
FIGS. 2 and 3 show rejection curves in automatic speech recognition systems of the prior art and, respectively, of the present invention.
Figure 3:
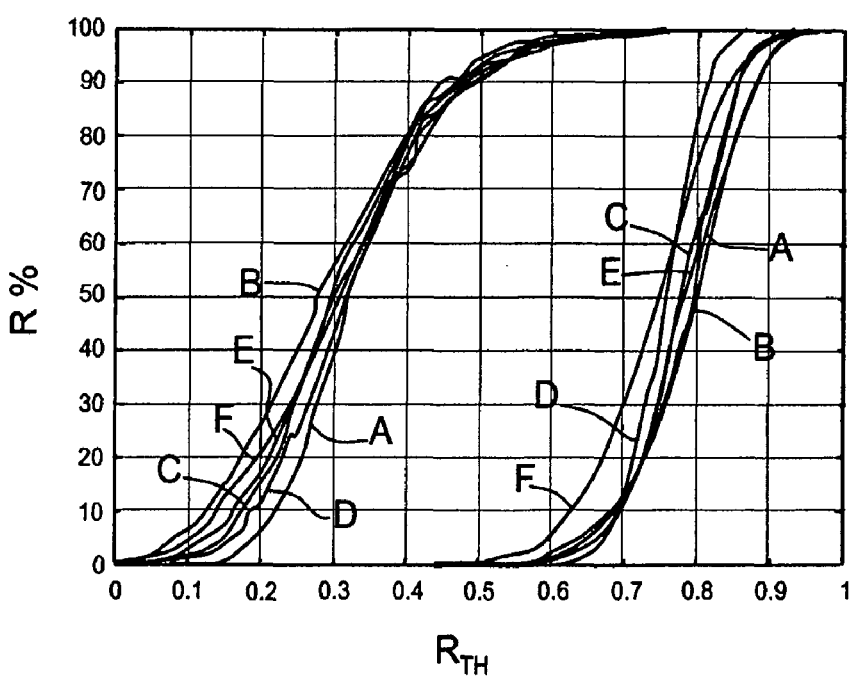

FIGS. 2 and 3 show rejection curves for a series of recognition grammars in UK English, which rejection curves represent the cumulative distribution of the percentage R % of recognitions that are rejected, with a rejection threshold $R_{TH}$ equal to the confidence on the abscissa. In particular, in FIGS. 2 and 3, A designates the curve relating to a Boolean grammar, B designates the curve relating to a currency grammar, C designates the curve relating to a date grammar, D designates the curve relating to a digit grammar, and E designates the curve relating to a number grammar.

In addition, FIG. 2 shows rejection curves obtained by computing the confidence according to a prior art technique, whereas FIG. 3 shows rejection curves obtained by computing the confidence according to the present invention.

FIGS. 2 and 3 each plots two sets of curves: the left-hand set, with a rejection rate that increases already at low confidences, corresponds to recognitions of formulations that fall outside the domain, whereas the right-hand set represents instead the rejection rates that are obtained on formulations covered by the grammars and correctly recognized. The curves enable calibration of the application rejection thresholds, estimating in advance the percentage of wrong recognitions erroneously proposed as correct (false acceptances) and the percentage of correct recognitions not considered as such (false rejections). As it may be immediately appreciated, the differential confidence computed according to the present invention enables the rejection curves to be rendered decidedly more stable and homogeneous as the recognition grammars vary.

Figure 4:
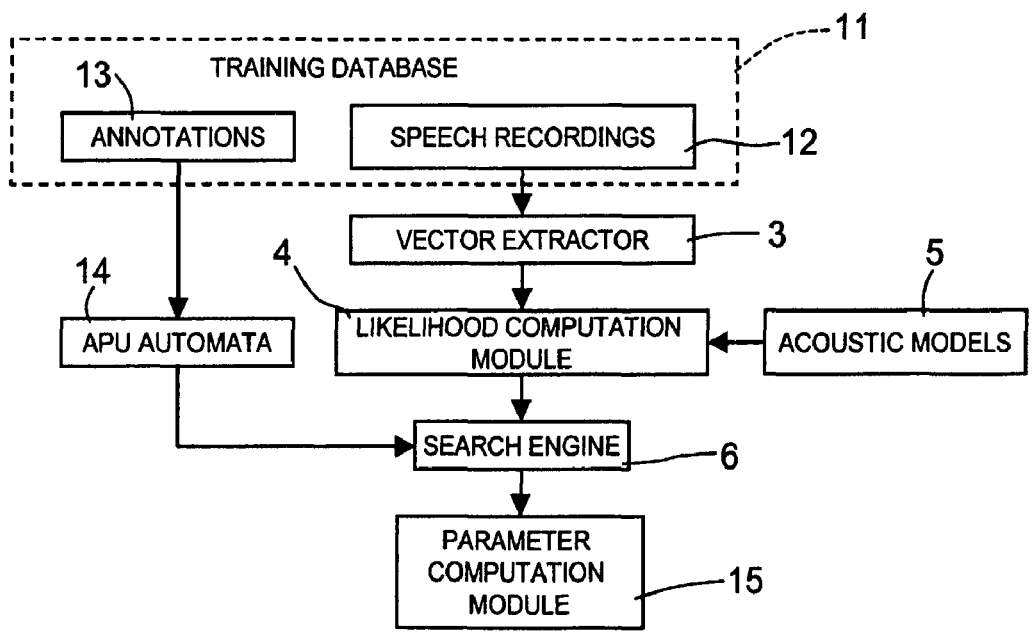
FIG. 4 shows a block diagram for estimating parameters of cumulative distributions.

As previously described with reference to FIG. 1, the parameters of the cumulative distributions provided to the confidence measure module are computed from training speech data. FIG. 4 shows the elements involved in the computation process.

Determination of the shape and parameters of the cumulative distributions requires the availability of training databases, represented in FIG. 4 by a dotted line and designated by 11, containing digitized speech recordings (block 12) and corresponding text annotations (block 13). The recordings are provided to the vector extractor 3, which in turn provide the likelihood computation module 4 with the observation vectors. The annotations are, instead, provided to an APU automaton module 14, which provides a single-thread sequence of elementary acoustic-phonetic units that corresponds to the recording under recognition. The emission likelihood computed by the likelihood computation module 4 on the basis of the observation vectors and the acoustic models, are provided, along with the single-thread sequence of elementary acoustic-phonetic units, to the search engine 6, which performs a dynamic time warping between the observation vectors and the states of the single-thread sequence of elementary acoustic-phonetic units. On the basis of the emission likelihoods from the likelihood computation module 4 and the alignment between observation vectors and states from the search engine 6 a parameter computation module 15 computes the parameters of the cumulative distributions, i.e., the argument of Eq. 4:

$$x_{i,t} = \log\frac{P(S_i \mid o_t)}{\max_{1 \le j \le N_s} P(S_j \mid o_t)} \quad \text{(Eq. 6)}$$

The values of Eq. 6, one for each frame t, are considered as realizations of a family of random variables, each of which is specific for a state of an elementary acoustic-phonetic unit.

In particular, the parameter computation module hypothesizes that the likelihood distributions belong to a given family (Gaussian distributions, Laplace distributions, gamma distributions, etc.) and determines its characteristic parameters. If Gaussian distributions are considered for the random variables $x_{i,t}$ the corresponding probability density function $f_{\xi_i}(x)$ is:

$$f_{\xi_i} = \frac{1}{\sqrt{2\pi}\sigma_i}e^{\frac{x_{i,t}-\mu_i}{\sigma_i}} \quad \text{(Eq. 7)}$$

the characteristic parameters of which, i.e., mean value and variance, are:

$$\mu_i = \frac{1}{T}\sum_{t=1}^{T} x_{i,t} \quad \text{(Eq. 8)}$$

$$\sigma_i^2 = \frac{1}{T}\sum_{t=1}^{T} x_{i,t}^2 - \mu_i^2 \quad \text{(Eq. 9)}$$

A particular embodiment of the present invention applies to stationary and transition elementary acoustic-phonetic units, and to emission likelihoods computed using an hybrid HMM-NN system optimized with the accelerating techniques described in WO 03/073416. The neural network receives the observation vectors from the vector extractor, and processes the observation vectors to provide indicators of the activity of each acoustic state, which are the components of the hidden Markov models that model the elementary acoustic-phonetic units.

The output values provided by the neural network $n_i$ are filtered by an appropriate function (sigmoid function), which enables the emission likelihoods (corresponding to the a posteriori likelihoods) to be computed, i.e., $P(S_i|o_t)$, which amount to 1 over the set of admissible states. Their definition is given in the following equation:

$$P(S_i | o_t) = \frac{e^{n_i(o_t)}}{\sum_{j=1}^{N} e^{n_j(o_t)}} \quad \text{(Eq. 10)}$$

By substituting Eq. 10 in Eq. 4, we obtain:

$$C_{i,t} = F_{\xi_i}\left\{\log\frac{e^{n_i(o_t)}}{e^{max_j n_j(o_t)}}\right\} = F_{\xi_i}\left[n_i(o_t) - \max_j n_j(o_t)\right] \quad \text{(Eq. 11)}$$

where $n_i$ is the constrained acoustic score, and max $n_j$ is the unconstrained acoustic score.

In this embodiment, the unconstrained acoustic score is computed directly from the emission likelihoods of the main hybrid HMM-NN recognition models. The choice of the acoustic state with the best emission likelihood is limited to the elementary acoustic-phonetic units of the stationary type, the outputs of which are always computed, in compliance with the accelerating techniques described in WO 03/073416.

In this embodiment, the confidence measure is defined by the following equation:

$$C_{DC} = \frac{1}{T}\sum_{t=1}^{T} F_{\xi_{i^*}}\left[n_{i^*}(o_t) - \max_{j\in stat} n_j(o_t)\right] \quad \text{(Eq. 12)}$$

where stat represents the set of stationary acoustic-phonetic units.

Finally, it is clear that numerous modifications and variants can be made to the present invention, all falling within the scope of the invention, as defined in the appended claims.

In particular, the present invention may be applied to automatic speech recognition systems that make use of Markov chains and dynamic time warping techniques, and that are based upon dynamic programming algorithms. These automatic speech recognition systems, in fact, include discrete and continuous hidden Markov models, with or without distribution sharing (with tying models). The emission likelihoods may be represented by likelihood distributions of various types, including mixtures of multivariate Gaussian distributions, Laplace distributions, etc. The emission likelihoods can also be obtained using the neural network techniques employed by hybrid HMM-NN systems.

The typology of the elementary acoustic-phonetic units that can be used with the confidence measure according to the invention includes both context-free units, such as context-independent phonemes, and context units, such as biphones, triphones or more specialized units. The present invention may also be applied to stationary and transition elementary acoustic-phonetic described in the above-referenced publication *Acoustic-Phonetic Modelling for Flexible Vocabulary Speech Recognition*.

Confidence measure may be applied using the various known techniques for obtaining the unconstrained acoustic score. These include the execution of a specific model, such as, for example, a completely connected phoneme network, to be executed in parallel to the main recognition with a Viterbi step without lexical constraints. Another possibility is to derive the unconstrained acoustic score from a subset of the models used for the main recognition, choosing the best relaxed-constraint model.

The family of cumulative distribution functions used to make the behaviour of the elementary acoustic-phonetic units uniform is defined based on a corresponding family of probability density functions used, which may have one or more predefined shapes, such as Gaussian, binomial, Poisson, Gamma, etc., or be completely estimated from training speech data, using fitting methods. In particular, data fitting is the mathematical analysis of a data set in order to analyze trends in the data values. This usually involves a regression analysis of the data values in order to define a set of parameter values that best characterize the relationship between the data points and a underlying theoretical model. In the former case (training), the estimation step is limited to determination of characteristic parameters of the distributions (e.g., mean value and variance in the case of Gaussian distributions). In the latter case, the training step has the purpose of gathering the data on which the fit of parametric functions with an adequate number of degrees of freedom is to be carried out.

The invention claimed is:

1. An automatic speech recognition method for identifying words from an input speech signal, comprising:
   providing at least one hypothesis recognition based on said input speech signal, said hypothesis recognition being an individual hypothesis word or a sequence of individual hypothesis words; and
   computing, by a processing system, a confidence measure for said hypothesis recognition, based on said input speech signal, said computing a confidence measure comprising:
      computing, by the processing system, differential contributions ($C_{i,t}$) to said confidence measure, each as a difference between a constrained acoustic score ($SCV_{i,t}$) and an unconstrained acoustic score ($SCL_t$); and
      computing, by the processing system, said confidence measure based on said differential contributions ($C_{i,t}$), comprising:
         weighting, by the processing system, each differential contribution ($C_{i,t}$) with a cumulative distribution function ($F_{\xi_i}$) of the differential contribution ($C_{i,t}$), wherein a probability distribution of the weighted differential contribution is a uniform distribution.

2. The automatic speech recognition method as claimed in claim 1, wherein said cumulative distribution functions ($F_{\xi_i}$) of the differential contributions ($C_{i,t}$) are such that distributions of the confidence measures are homogeneous in terms of rejection capability, as at least one of language, vocabulary and grammar varies.

3. An automatic speech recognition method as claimed in claim 1, wherein each differential contribution ($C_{i,t}$) is computed according to the following equation:

$$C_{i,t} = F_{\xi_i}(SCV_{i,t} - SCL_t)$$

wherein $C_{i,t}$ is said differential contribution, ($F_{\xi_i}$) is said cumulative distribution function, $SCV_{i,t}$ is said constrained acoustic score for acoustic state i of a hidden Markov model which models a given acoustic-phonetic unit, which, in turn, models a corresponding speech phenomena at input speech frame t, and $SCL_t$ is said unconstrained acoustic score at input speech frame t.

4. The automatic speech recognition method as claimed in claim 3, wherein said constrained acoustic score ($SCV_{i,t}$) is computed according to the following equation:

$$SCV_{i,t} = \log P(S_i|o_t)$$

wherein $P(S_i * o_t)$ is a likelihood of emission of acoustic states $S_i$, given an observation vector $o_t$ extracted from the input speech signal at input speech frame t.

5. The automatic speech recognition method as claimed in claim 4, wherein said unconstrained acoustic score ($SCL_t$) is computed according to the following equation:

$$SCL_t = \log\left[\max_{1 \leq j \leq N_s} P(S_j | o_t)\right]$$

wherein $N_s$ is the total number of states of the hidden Markov models.

6. The automatic speech recognition method as claimed in claim 5, wherein each differential contribution ($C_{i,t}$) is computed according to the following equation:

$$C_{i,t} = F_{\xi_i}\left\{\log\frac{P(S_i | o_t)}{\max_{1 \leq j \leq N_s} P(S_j | o_t)}\right\}.$$

7. The automatic speech recognition method as claimed in claim 1, wherein said confidence measure is computed as a temporal average of said weighted differential contributions ($C_{i,t}$) over the sequence of recognized acoustic states ($S_i^*$) of elementary acoustic-phonetic units forming said recognition.

8. The automatic speech recognition method as claimed in claim 6, wherein said confidence measure is computed according to the following equation:

$$C_{DC} = \frac{1}{T}\sum_{t=1}^{T} F_{\xi_i^*}\left\{\log\frac{P(S_{i^*} | o_t)}{\max_{1 \leq j \leq N_s} P(S_j | o_t)}\right\}$$

where T is the number of frames of the input speech signal.

9. The automatic speech recognition method as claimed in claim 4, wherein said emission likelihood is a posteriori likelihood computed from a likelihood based on a hidden Markov model.

10. The automatic speech recognition method as claimed in claim 4, wherein said emission likelihood is an a posteriori likelihood computed by an artificial neural network of a hybrid hidden Markov model-neural network system.

11. The automatic speech recognition method as claimed in claim 4, wherein said emission likelihood is computed by a hybrid hidden Markov model-neural network system according to the following equation:

$$P(S_i | o_t) = \frac{e^{n_i(o_t)}}{\sum_{j=1}^{N} e^{n_j(o_t)}}$$

wherein $n_i(o_t)$ is the output of said neural network and is indicative of the activity of the acoustic state $S_i$, given the observation vector $o_t$.

12. The automatic speech recognition method as claimed in claim 11, wherein said differential contribution ($C_{i,t}$) is computed as follows:

$$C_{i,t} = F_{\xi_i}\left\{\log\frac{e^{n_i(o_t)}}{e^{\max_j n_j(o_t)}}\right\} = F_{\xi_i}\left[n_i(o_t) - \max_j n_j(o_t)\right].$$

13. An automatic speech recognition method as claimed in claim 12, wherein said confidence measure is computed as follows:

$$C_{DC} = \frac{1}{T}\sum_{t=1}^{T} F_{\xi_{i^*}}\left[n_{i^*}(o_t) - \max_{j \in stat} n_j(o_t)\right]$$

where T is the number of frames of the input speech signal.

14. The automatic speech recognition method as claimed in claim 1, wherein each cumulative distribution function ($F_{\xi_i}$) is based on a probability density function with one of a Gaussian shape, a binomial shape, a Poisson shape, and a Gamma shape.

15. The automatic speech recognition method as claimed in claim 1, wherein each cumulative distribution function ($F_{\xi_i}$) is trained from training speech data using fitting methods.

16. An automatic speech recognition system for identifying words from an input speech signal, comprising:
   a search engine configured to provide at least one hypothesis recognition based on said input speech signal, said hypothesis recognition being an individual hypothesis word or a sequence of individual hypothesis words; and
   a confidence measure module configured to compute a confidence measure for said hypothesis recognition based on said input speech signal;
   said confidence measure module being configured to compute said confidence measure using the method according to claim 1.

17. A non-transitory computer-readable storage medium encoded with a computer program product comprising a computer program code, when executed by a processing system, causing the processing system to perform the method according to claim 1.

* * * * *